United States Patent
Bodine (10) Patent No.: US 9,632,787 B2
(45) Date of Patent: Apr. 25, 2017

(54) DATA PROCESSING SYSTEM WITH DATA CHARACTERISTIC BASED IDENTIFICATION OF CORRESPONDING INSTRUCTIONS

(71) Applicant: CA, Inc., Islandia, NY (US)

(72) Inventor: Gregory Lewis Bodine, Cary, NC (US)

(73) Assignee: CA, Inc., Islandia, NY (US)

( * ) Notice: Subject to any disclaimer, the term of this patent is extended or adjusted under 35 U.S.C. 154(b) by 1106 days.

(21) Appl. No.: 13/658,372

(22) Filed: Oct. 23, 2012

(65) Prior Publication Data

US 2014/0115300 A1   Apr. 24, 2014

(51) Int. Cl.
  *G06F 9/38* (2006.01)
  *H04L 12/26* (2006.01)
  *H04L 29/06* (2006.01)

(52) U.S. Cl.
  CPC ........ *G06F 9/3802* (2013.01); *H04L 43/0876* (2013.01); *H04L 63/10* (2013.01)

(58) Field of Classification Search
  CPC .................................................... G06F 9/3013
  USPC ........................................................ 712/205
  See application file for complete search history.

(56) References Cited

U.S. PATENT DOCUMENTS

| | | | |
|---|---|---|---|
| 4,821,174 A * | 4/1989 | Webb et al. | 710/107 |
| 6,094,708 A * | 7/2000 | Hilla et al. | 711/138 |
| 6,470,443 B1 * | 10/2002 | Emer et al. | 712/205 |
| 2002/0174300 A1 | 11/2002 | Kotani et al. | |
| 2004/0049615 A1 * | 3/2004 | Liang | 710/52 |
| 2008/0008210 A1 * | 1/2008 | Godlewski | 370/463 |
| 2011/0238964 A1 * | 9/2011 | Yuasa et al. | 712/234 |

FOREIGN PATENT DOCUMENTS

| | | |
|---|---|---|
| EP | 0 911 728 A1 | 4/1999 |
| FR | 2 826 471 A1 | 12/2002 |

OTHER PUBLICATIONS

D.S. Katz et al., "Data-Oriented Distributed Computing for Science: Reality and Possibilities", Center for Computation & Technology, Louisiana State University, Jet Propulsion Laboratory, California Institute of Technology, Lecture Notes in Computer Science: 2006, vol. 42, pp. 1119-1124.

Extended European Search Report Corresponding to European Patent Application No. 13187878.7, Date of Mailing: May 26, 2014; 7 pages.

* cited by examiner

*Primary Examiner* — Andrew Caldwell
*Assistant Examiner* — Michael Metzger
(74) *Attorney, Agent, or Firm* — Sage Patent Group (57) ABSTRACT

Some methods, computer program products, and data processing nodes identify a data unit in a data memory that is to be operated upon by a processor circuit, and uses a characteristic of the data unit to identify what instruction(s) within an instruction memory is be executed by the processor circuit to perform an operation upon the data unit. The data memory may be local to the processor circuit, and the instruction memory may be remotely accessible to the processor circuit through a data network.

22 Claims, 4 Drawing Sheets

DATA PROCESSING SYSTEM WITH DATA CHARACTERISTIC BASED IDENTIFICATION OF CORRESPONDING INSTRUCTIONS

BACKGROUND

The present disclosure relates to data processing systems, and more specifically, to operations and methods for fetching instructions from memory.

Known data processing systems process data through a sequence of operations that include: 1) fetching an instruction from memory; 2) decoding the instruction to identify an address to a location in memory for data that is to be operated upon by the instruction; 3) fetching the data from the memory; 4) performing the instruction to operate on the data; and 5) then storing/communicating the result. The instructions and memory may reside in the same memory. However, databases and other large data applications have led to architectures where the instructions reside in memory that is local to the processor, while the data resides in remote data memories that are network accessible to the processor.

BRIEF SUMMARY

One embodiment of the disclosure is directed to a method that includes selecting a data unit, from among a plurality of data units in a data memory, that is to be operated upon by a processor circuit. An instruction is identified among a plurality of instructions in an instruction memory, responsive to a characteristic of the data unit. The instruction is requested from the instruction memory for execution by the processor circuit to operate on the data unit.

In a further embodiment, content of the data unit is examined to identify a network address for accessing the instruction memory of an instruction storage node through a data network. The instruction is retrieved from the address within the instruction memory by communicating a message through the data network that is directed to the network address and requests retrieval of the instruction from the instruction memory of the instruction storage node. An address of the instruction may be determined responsive to the value of a plurality of defined bit locations of the data unit, and other bit locations of the data unit may be used to determine a data value that is to be operated on by the instruction.

In a further embodiment, a characteristic of the data unit is used to determine an execution cycle rate at which the instruction will be scheduled for execution by the processor circuit, and the address of the instruction is determined in response to the execution cycle rate. Alternatively or additionally, a characteristic of the data unit is used to determine an execution priority level at which the instruction will be prioritized for execution by the processor circuit, and the address of the instruction is determined in response to the execution priority level.

Another embodiment of the disclosure is directed to a computer program product that includes a computer readable storage medium having computer readable program code embodied therein. Computer readable program code is configured to select a data unit, from among a plurality of data units in a data memory, that is to be operated upon by a processor circuit. Other computer readable program code is configured to identify an instruction, among a plurality of instructions in an instruction memory, responsive to a characteristic of the data unit. Other computer readable program code is configured to request the instruction from the instruction memory for execution by the processor circuit to operate on the data unit.

Another embodiment of the disclosure is directed to a data processing node that includes a network interface, a data memory, and a processor circuit. The network interface communicates through a data network with an instruction memory. The data memory includes a plurality of data units. The processor circuit selects a data unit from among the plurality of data units in the data memory, identifies an instruction, among a plurality of instructions in the instruction memory, responsive to a characteristic of the data unit, and requests the instruction from the instruction memory for execution by the processor circuit to operate on the data unit.

BRIEF DESCRIPTION OF THE DRAWINGS

Aspects of the present disclosure are illustrated by way of example and are not limited by the accompanying figures, in which like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

As explained above, some databases and other large data applications have led to computer architectures where instructions reside in memory that is local to the processor, while data resides in remote data memories (e.g., servers) that are accessible to the processor over a data network. Although locating instructions near the processor can reduce instruction access times and provide tight coupling between the processor and instructions, it may not be feasible to share such instructions among a plurality of networked processors. Moreover, the remoteness of the data memory from the processor can increase data access time and slow data processing performance for data intensive applications.

In various present embodiments, the order of operations of known systems for accessing instructions and then data is reversed. An operating system (OS), microcode, or other instructions performed by a data processing node identifies a data unit in a data memory that is to be operated upon by a processor circuit, and then identifies what instruction(s) within an instruction memory is be executed by the processor circuit to perform an operation upon the data unit. The data memory may be local to the processor circuit, and the instruction memory may be remotely accessible to the processor circuit through a data network.

As used herein, a data unit is any length of data bits that are operated upon (e.g., an arithmetic operation) during one or more cycles of a processor circuit or other instruction execution circuit that is executing one or more instructions. Data units in a data memory may have the same or differing bit lengths. Instructions in an instruction memory may also have the same or differing bit lengths.

Figure 1:
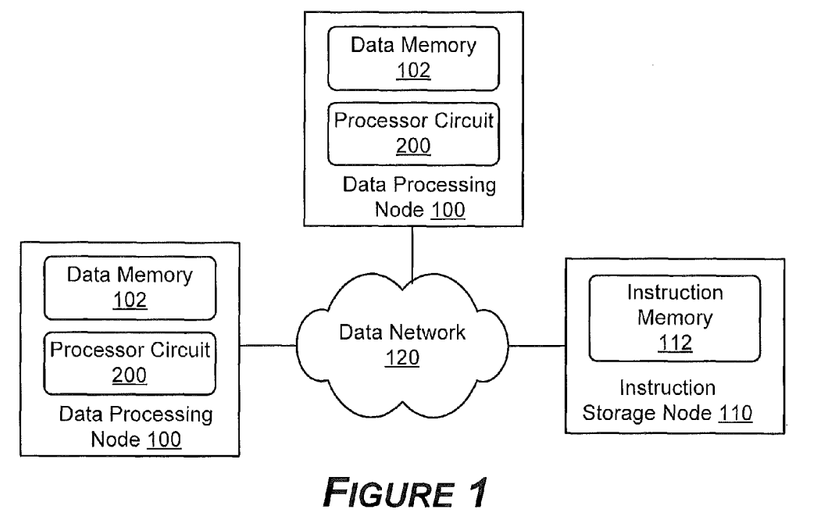
FIG. 1 illustrates an example data processing system that includes a plurality of data processing nodes containing local data memory and an instruction storage node containing instruction memory.

FIG. 1 illustrates an example data processing system that includes a plurality of data processing nodes 100 and an instruction storage node 110 that are communicatively connected by one or more data networks 120. Any number of data processing nodes 100, instruction storage nodes 110, and data networks 120 may be included in the data processing system. The data processing node 100 includes locally attached data memory 102 containing data units that can be operated upon by a processor circuit 200. The data memory 102 may, for example, reside on a same substrate as the processor circuit 200, reside within a same integrated circuit package as the processor circuit 200, be connected to the processor circuit 200 through a dedicated memory bus, or be connected to the processor circuit 200 through a shared backplane bus of a printed circuit board to which the data memory 102 and the processor circuit 200 are fixedly or removably connected.

The instruction storage node 110 includes instructions in an instruction memory 112 that are executable by the processor circuit 200 to operate on the data units in the data memory 102. In contrast to the data memory 102 that is locally attached to the processor circuit 200, the instruction memory 112 is remotely connected to the processor circuit 200 through the data network 120. Locally connecting the data memory 102 to the processor circuit 200 can reduce data memory 102 access times and provide tight coupling between the processor circuit 200 and data units. Because instructions are made available through the networked instruction storage node 110, the instructions can be efficiently shared among a plurality of the data processing nodes 100. Thus, for example, a database application which can benefit from high throughput and/or low latency processing of larger quantities of data and from networked sharing of instructions, may be effectively hosted on the data processing system of FIG. 1.

The data network 120 may be a personal area network (e.g., USB or Firewire network), a local area network (e.g., IEEE 802.11), a storage area network, a metropolitan area network, a wide area network, and/or other public (e.g., Internet) and/or private networks. The storage area network (SAN) is a dedicated network between the data processing node 100 and instruction storage node 110 that provides access to consolidated, block level data storage, to make storage devices, such as disk arrays and tape libraries, of the instruction storage node 110 appear like locally attached devices to the data processing node 100. The data network 120 may include wired and/or wireless (e.g., cellular network, wireless local area network, wireless metropolitan area network, satellite network, etc.) air interface communication connections.

Figure 2:
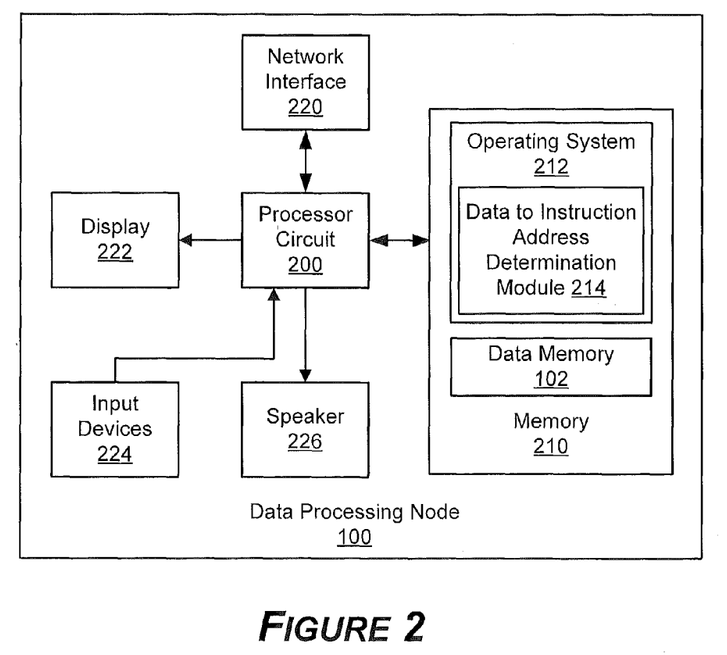
FIG. 2 illustrates example components of the data processing node of FIG. 1.

FIG. 2 illustrates example components of the data processing node 100 of FIG. 1. The data processing node 100 can include the processor circuit 200, a network interface 220 configured to communicate through the data network 120, and a memory 210 that includes the data memory 102. The processor circuit 200 may include one or more data processing circuits, such as a general purpose and/or special purpose processor (e.g., microprocessor and/or digital signal processor). The processor circuit 200 is configured to execute instructions (i.e., program code) from the memory 210, described below as a computer readable medium, to perform some or all of the operations that are described as being performed by the data processing node 100 according to one or more embodiments disclosed herein. The memory 210 may represent a hierarchy of memory that may include volatile and/or non-volatile memory devices, such as electronic flash memory devices, magnetic disk drives, and/or optical disk drives. The memory 210 can further include an operating system 212 that includes a data-to-instruction address determination module 214, which identifies a location of an instruction in the instruction memory 112 that is to be executed by the processor circuit 200 to operate on a data unit that has been, or will be, obtained from the data memory 102. The data-to-instruction address determination module 214 may additionally or alternatively reside in microcode that is part of, or accessible by, the processor circuit 200. The data processing node 100 may include a display device 222, user/machine input devices 224 (e.g., keyboard, touch sensitive display interface, voice recognition, etc.), and/or a speaker device 226.

Figure 3:
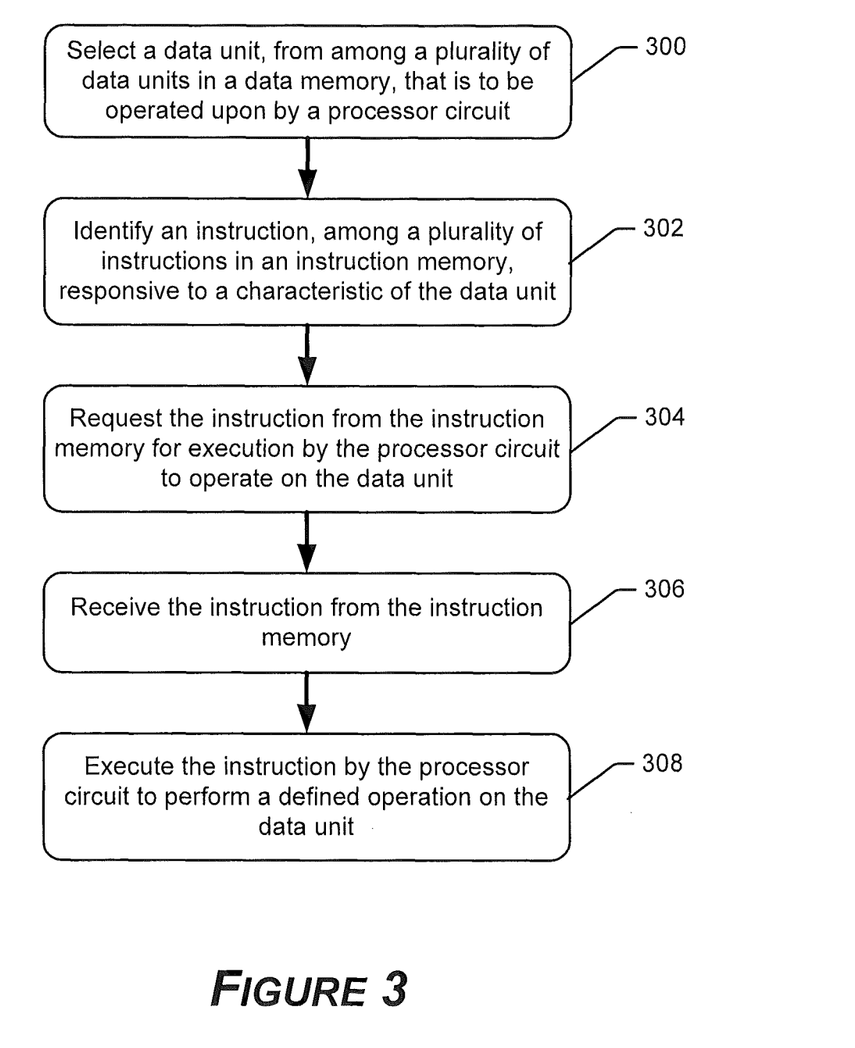
FIGS. 3-7 illustrates example operations to identify, obtain, and execute instructions from a remote networked memory for operation on data units in a local data memory.

FIG. 3 illustrates example operations that use a characteristic of a selected data unit in a local data memory to identify, obtain, and execute an instruction from a remote memory for operation on the data unit. A data unit is selected (block 300) from among a plurality of data units in the data memory 102, where the data unit is to be operated upon by the processor circuit 200. An instruction is identified (block 302) among a plurality of instructions in the instruction memory 112, responsive to a characteristic of the data unit. The instruction is requested (block 304) from the instruction memory 112 for execution by the processor circuit 200 to operate on the data unit. The instruction is received (block 306) from the instruction memory 112, and executed (block 308) by the processor circuit 200 to perform an operation defined by the instruction on the data unit. Various operations that the instruction may cause the processor circuit 200 to perform on the data unit can include, but are not limited to, arithmetic (e.g., addition, subtraction, multiplication, division), bitwise (e.g., AND, OR, XOR), and logical (e.g., value comparison).

Although various embodiments are described in the context of identifying an instruction responsive to a characteristic of a data unit, these embodiments are not limited to using a single data unit to identify a single instruction. Instead, a plurality of data units may be used to identify a single instruction, a single instruction may be used to identify a plurality of instructions, or any other number of data units may be used to identify any other number of instructions.

Figure 4:
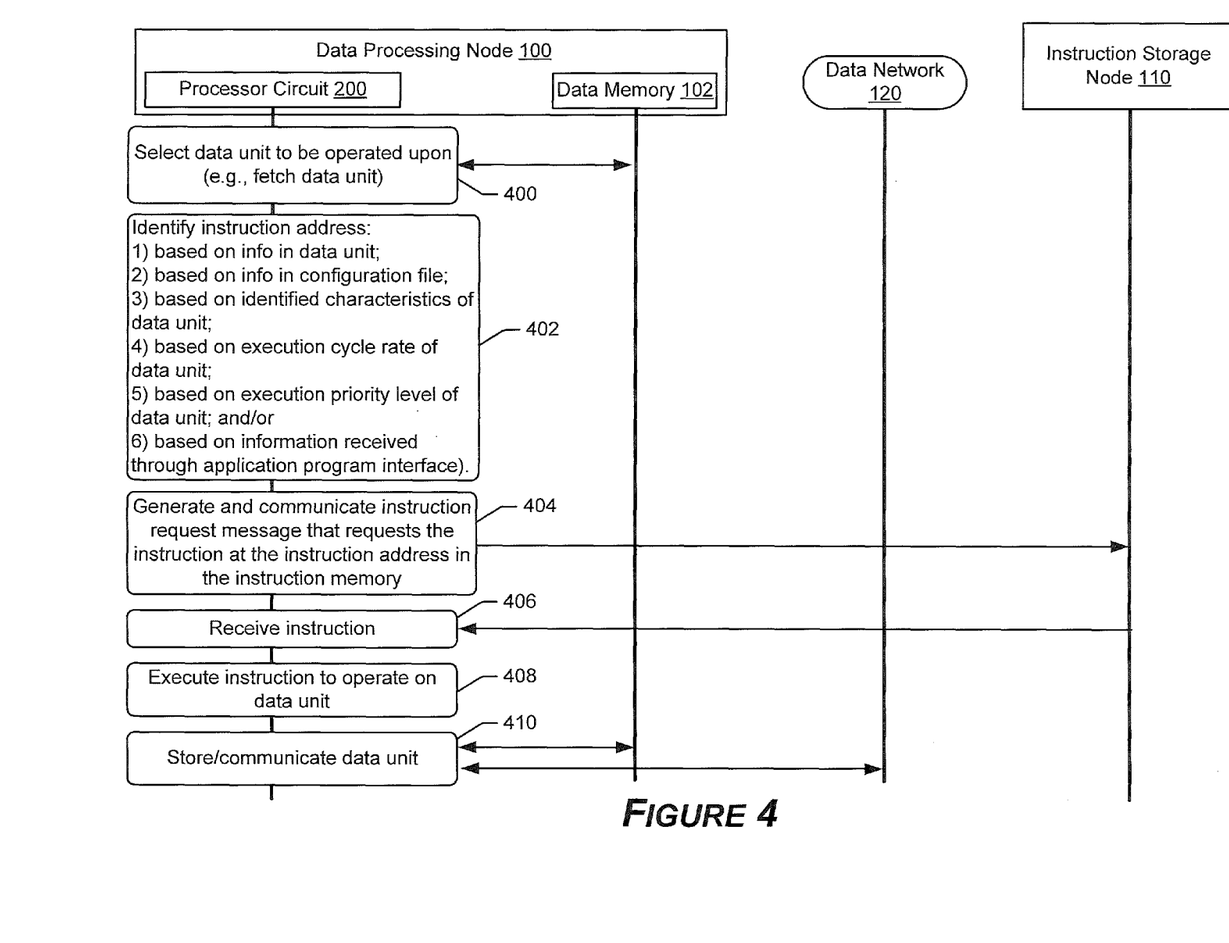

FIG. 4 illustrates further example operations that use to a characteristic of a selected data unit in a local data memory to identify, obtain, and execute an instruction from a remote memory for operation on the data unit. The processor circuit 200 selects (block 400) a data unit within the data memory 102 that is to be operated upon by a yet-to-be identified instruction. The processor circuit 200 identifies (block 402) an address to an instruction based on one or more defined characteristics of the data unit. The processor circuit 200 generates and communicates (block 404) an instruction request message through the data network 120 to the instruction storage node 110 that requests communication of the instruction located at the identified instruction address in the instruction memory 112. The processor circuit 200 receives (block 406) the instruction from the instruction storage node 110, executes (block 408) the instruction to operate on the data unit, and stores (block 410) the data unit (resulting from the instruction operation) in the data memory 102 and/or communicates (block 410) the data unit through the data network 120 to another network node.

Figure 5:
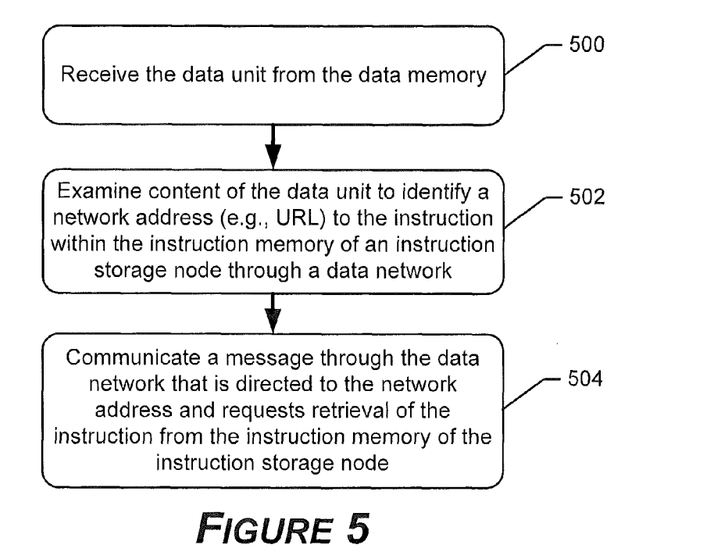
Figure 6:
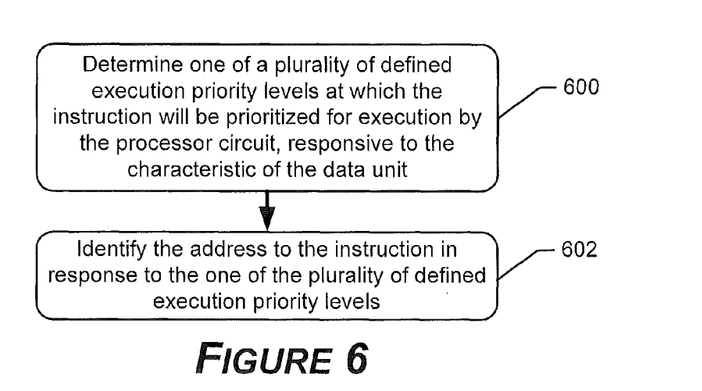

The address of the instruction within the instruction memory 112 may be determined by the processor circuit 200 by examining content of the data unit. FIG. 5 illustrates example operations to identify an instruction in the instruction memory 112 responsive to content of the data unit. The operations may be performed by the processor circuit 200 of the data processing node 100. The data unit is received (block 500) from the data memory 102. A network address is identified (block 502) from the content of the data unit that enables communication (e.g. routing) of the instruction request message through the data network 120 to the instruction storage node 110, and further identifies a location of the instruction in the instruction memory 112 that is to be retrieved and communicated to the data processing node 100 that sent the message. The processor circuit 200 communicates (block 504) a message through the data network 120 that is directed to the network address and requests retrieval of the instruction from the instruction memory 112 of the instruction storage node 110.

What information is identified for obtaining an instruction will vary based on the type, or sequence, of communications used by the processor to obtain instructions from the instruction memory 112. The network address may include a Uniform Resource Locator (URL) address. The message communicated to the instruction storage node 110 may include an URL address that identifies a location of a network accessible file within the instruction memory 112 that contains the instruction. The message may contain a file read request message that identifies the URL address of the file that is to be accessed on the instruction storage node 110.

The network accessible file may contain other instructions that are to be executed to operate on the data unit or on a plurality of data units. For example, a first instruction in the file within the instruction memory 112 may be retrieved and executed to operate on the data unit, a next sequentially occurring instruction in the file may be retrieved and executed to operate on a next sequentially occurring data unit in the data memory 102, and so on with further sequentially occurring instructions in the file being retrieved and sequentially executed to operate on further sequentially occurring data units in the data memory 102. Alternatively, the first instruction in the file may be used to operate on a plurality of sequentially occurring or other identified data units.

Each data unit may include an instruction pointer that is embedded in each respective data unit (e.g., stored within or adjacent to contiguous addressable locations of the data unit in the data memory 102) or otherwise logically associated with the data unit. The length of the data unit may correspond to the number of bits that the processor circuit 200 fetches with each memory access cycle. Alternatively, a group of data units may be associated with a same instruction pointer. In one embodiment, when examining the content of the data unit to identify (block 402) the address to the instruction within the instruction memory 112, the processor circuit 200 determines the address to the instruction responsive to a plurality of defined bit locations of the data unit, and determines a data content portion of the data unit that is to be operated upon by the instruction responsive to other defined bit locations of the data unit. The processor circuit 200 may thereby, for example, interpret a numeric value defined by a first group of bit locations of the data unit as an address of the instruction, and interpret a numeric value defined by a second group of bit locations of the data unit (which may or may not overlap the first group of bit locations) as defining a data value that is to be operated upon by the addressed instruction.

Different configuration files may be associated with different data units, and the processor circuit 200 may identify locations of instructions that are to be fetched to operate on the respective data units responsive to information in the respective configuration files. For example, the data memory 102 can include a plurality of configuration files that are associated with different groups of the plurality of instructions in the instruction memory 112. When examining the content of the data unit to identify (block 402) the address to the instruction within the instruction memory 112, the processor circuit 200 selects one of the plurality of configuration files responsive to the content of the data unit, and identifies the address to the instruction within the structure memory 112 responsive to information contained in the one of the plurality of configuration files that was selected.

Alternatively, a single configuration file may contain information items that each identify a location of an instruction that is to be executed to operate on a corresponding data unit. The processor circuit 200 can identify which of the information items in the configuration file is associated with a particular ones of the data units responsive to characteristics of the particular data unit. For example, the data memory 102 can include a configuration file that identifies addresses of instructions in the instruction memory 112. When examining the content of the data unit to identify (block 402) the address to the instruction within the instruction memory 112, the processor circuit 200 determines a location within the configuration file responsive to the content of the data unit. An information item is obtained from the location within the configuration file, and the address to the instruction in the instruction memory 112 is identified in response to the information item.

The processor circuit 200 may identify characteristics of a data unit (e.g., classify the data unit as one of a plurality of defined types), and use the identified characteristics to identify a location of instructions that are to be obtained from the instruction memory 112 to operate on the data unit.

Figure 7:
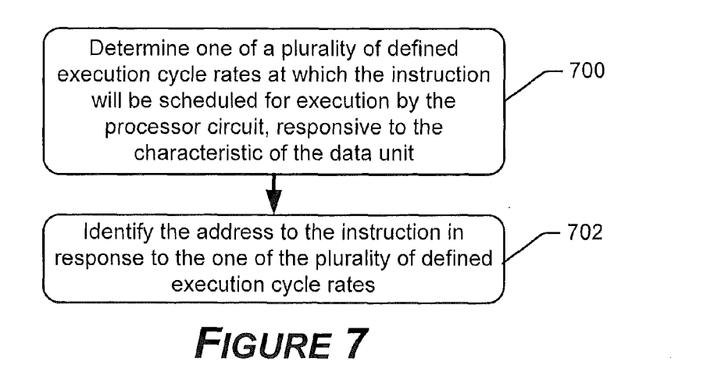

Execution of different data units by the processor circuit 200 may be managed according to defined execution priority levels. The locations of instructions that are to be obtained from the instruction memory 112 to operate on the corresponding data units may be determined responsive to their associated execution priority levels. Referring to FIG. 7, one of a plurality of defined execution priority levels at which the instruction will be prioritized for execution by the processor circuit 200 is determined (block 600) responsive to the characteristic of the data unit. The address to the instruction in the instruction memory 112 is identified (block 602) responsive to the one of the plurality of defined execution priority levels.

Different data units, or groups of data units, may be scheduled for execution by the processor circuit 200 at different execution cycle rates. The locations of instructions that are to be obtained from the instruction memory 112 to operate on the corresponding data units may be determined responsive to their associated scheduled execution cycle rates. Referring to FIG. 7, one of a plurality of defined execution cycle rates at which the instruction will be scheduled for execution by the processor circuit 200 is determined (block 700) responsive to the characteristic of the data unit. The address to the instruction in the instruction memory 112 is identified (block 702) responsive to the one of the plurality of defined execution cycle rates.

The processor circuit 200 may receive the data unit and a pointer to the instruction in the instruction memory 112 through an application program interface (e.g., command line interface, a machine to machine application interface, etc.).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    selecting a data unit, from among a plurality of data units in a data memory, that is to be operated upon by a processor circuit;
    identifying an instruction, among a plurality of instructions in an instruction memory, responsive to a characteristic of the data unit, the identifying comprising:
        receiving the data unit from the data memory;
        examining content of the data unit to identify a network address for accessing the instruction memory of an instruction storage node through a data network; and
        communicating a message through the data network that is directed to the network address and requests retrieval of the instruction from the instruction memory of the instruction storage node;
    requesting the instruction from the instruction memory for execution by the processor circuit to operate on the data unit;
    receiving the instruction from the instruction memory; and
    executing the instruction by the processor circuit to perform a defined operation on the data unit.

2. The method of claim 1, wherein:
    identifying the network address for accessing the instruction memory of the instruction storage node through the data network comprises identifying a Uniform Resource Locator (URL) address from the content of the data unit, the URL address identifying a location of a network accessible file containing the instruction; and
    communicating the message through the data network that is directed to the network address and requests retrieval of the instruction comprises communicating a file read request message that identifies the URL address.

3. The method of claim 1, wherein examining content of the data unit to identify the network address for accessing the instruction memory of the instruction storage node through the data network, comprises:
    determining the network address to the instruction responsive to a plurality of defined bit locations of the data unit; and
    determining a data content portion of the data unit that is to be operated upon by the instruction responsive to other defined bit locations of the data unit.

4. The method of claim 1, wherein examining content of the data unit to identify the network address for accessing the instruction memory of the instruction storage node through the data network, comprises:
    determining a location within a configuration file responsive to the content of the data unit;
    obtaining information from the location within the configuration file; and
    identifying the network address for accessing the instruction memory of the instruction storage node in response to the information.

5. The method of claim 1, wherein:
    a plurality of configuration files are associated with different groups of the plurality of instructions in the instruction memory; and
    examining content of the data unit to identify the address to the network address for accessing the instruction memory of the instruction storage node through the data network, comprises:
        selecting one of the plurality of configuration files responsive to the content of the data unit; and
        identifying the network address for accessing the instruction memory of the instruction storage node in response to information contained in the one of the plurality of configuration files that was selected.

6. The method of claim 1, wherein identifying the instruction, among the plurality of instructions in an instruction memory, responsive to the characteristic of the data unit, comprises:
    determining one of a plurality of defined execution cycle rates at which the instruction will be scheduled for execution by the processor circuit, responsive to the characteristic of the data unit; and
    identifying the network address for accessing the instruction memory of the instruction storage node in response to the one of the plurality of defined execution cycle rates.

7. The method of claim 1, wherein identifying the instruction, among the plurality of instructions in an instruction memory, responsive to the characteristic of the data unit, comprises:
    determining one of a plurality of defined execution priority levels at which the instruction will be prioritized for execution by the processor circuit, responsive to the characteristic of the data unit; and
    identifying the network address for accessing the instruction memory of the instruction storage node in response to the one of the plurality of defined execution priority levels.

8. The method of claim 1, further comprising:
    receiving the data unit and a pointer to the instruction in the instruction memory through an application programming interface.

9. A computer program product comprising:
    a non-transitory computer readable storage medium having computer readable program code embodied therein, the computer readable program code comprising:
        computer readable program code configured to select a data unit, from among a plurality of data units in a data memory, that is to be operated upon by a processor circuit;
        computer readable program code configured to identify an instruction, among a plurality of instructions in an instruction memory, responsive to a characteristic of the data unit, the identifying comprising:
            receiving the data unit from the data memory;
            examining content of the data unit to identify a network address for accessing the instruction memory of an instruction storage node through a data network; and communicating a message through the data network that is directed to the network address and requests retrieval of the instruction from the instruction memory of the instruction storage node;

computer readable program code configured to request the instruction from the instruction memory for execution by the processor circuit to operate on the data unit;

computer readable program code configured to receive the instruction from the instruction memory; and computer readable program code configured to perform a defined operation on the data unit when the processor circuit executes the instruction.

10. The computer program product of claim 9, wherein the computer readable program code configured to identify the instruction, among the plurality of instructions in the instruction memory, responsive to the characteristic of the data unit, comprises:

computer readable program code configured to receive the data unit from the data memory;

computer readable program code configured to examine content of the data unit to identify an address to the instruction within the instruction memory; and computer readable program code configured to retrieve the instruction from the address within the instruction memory.

11. The computer program product of claim 9, wherein the computer readable program code configured to examine content of the data unit to identify the network address for accessing the instruction memory of the instruction storage node through the data network, comprises:

computer readable program code configured to determine the network address to the instruction responsive to a plurality of defined bit locations of the data unit; and computer readable program code configured to determine a data content portion of the data unit that is to be operated upon by the instruction responsive to other defined bit locations of the data unit.

12. The computer program product of claim 9, wherein the computer readable program code configured to examine content of the data unit to identify the network address for accessing the instruction memory of the instruction storage node through the data network, comprises:

computer readable program code configured to determine a location within a configuration file responsive to the content of the data unit;

computer readable program code configured to obtain information from the location within the configuration file; and computer readable program code configured to identify the network address for accessing the instruction memory of the instruction storage node in response to the information.

13. The computer program product of claim 9, wherein:

a plurality of configuration files are associated with different groups of the plurality of instructions in the instruction memory; and the computer readable program code configured to examine content of the data unit to identify the address to the network address for accessing the instruction memory of the instruction storage node through the data network, comprises:

computer readable program code configured to select one of the plurality of configuration files responsive to the content of the data unit; and computer readable program code configured to identify the network address for accessing the instruction memory of the instruction storage node in response to information contained in the one of the plurality of configuration files that was selected.

14. The computer program product of claim 9, wherein the computer readable program code configured to identify the instruction, among the plurality of instructions in an instruction memory, responsive to the characteristic of the data unit, comprises:

computer readable program code configured to select one of a plurality of defined execution cycle rates at which the instruction will be scheduled for execution by the processor circuit, responsive to the characteristic of the data unit; and computer readable program code configured to identify the network address for accessing the instruction memory of the instruction storage node in response to the one of the plurality of defined execution cycle rates.

15. The computer program product of claim 9, wherein the computer readable program code configured to identify the instruction, among the plurality of instructions in an instruction memory, responsive to the characteristic of the data unit, comprises:

computer readable program code configured to select one of a plurality of defined execution priority levels at which the instruction will be prioritized for execution by the processor circuit, responsive to the characteristic of the data unit; and computer readable program code configured to identify the network address for accessing the instruction memory of the instruction storage node in response to the one of the plurality of defined execution priority levels.

16. The computer program product of claim 9, further comprising:

computer readable program code configured to receive the data unit and a pointer to the instruction in the instruction memory through an application programming interface.

17. A data processing node comprising:

a network interface to communicate through a data network with an instruction memory;

a data memory comprising a plurality of data units; and a processor circuit to:

select a data unit from among the plurality of data units in the data memory, identify an instruction, among a plurality of instructions in the instruction memory, responsive to a characteristic of the data unit, the identification of the instruction comprising:

receiving the data unit from the data memory;

examining content of the data unit to identify a network address for accessing the instruction memory of an instruction storage node through a data network; and communicating a message through the data network that is directed to the network address and requests retrieval of the instruction from the instruction memory of the instruction storage node, request the instruction from the instruction memory for execution by the processor circuit to operate on the data unit;

receive the instruction from the instruction memory; and execute the instruction to perform a defined operation on the data unit.

18. The data processing node of claim 17, wherein:

the processor circuit is further to receive the data unit from the data memory through the network interface, to identify a Uniform Resource Locator (URL) address from the content of the data unit that identifies a location of a network accessible file in the instruction memory containing the instruction, and to communicate a file read request message that identifies the URL address through the network interface.

19. The data processing node of claim 17, wherein:

the processor circuit is further to determine the network address for accessing the instruction memory of the instruction storage node through the data network responsive to a plurality of defined bit locations of the data unit, and to determine a data content portion of the data unit that is to be operated upon by the instruction responsive to other defined bit locations of the data unit.

20. The data processing node of claim 17, wherein:

the processor circuit is further to determine a location within a configuration file responsive to the content of the data unit, to obtain information from the location within the configuration file, and to identify the network address for accessing the instruction memory of the instruction storage node in response to the information.

21. The data processing node of claim 17, wherein:

the processor circuit is further to select one of a plurality of defined execution cycle rates at which the instruction will be scheduled for execution by the processor circuit, responsive to the characteristic of the data unit, and to identify the network address for accessing the instruction memory of the instruction storage node in response to the one of the plurality of defined execution cycle rates.

22. The data processing node of claim 17, wherein:

the processor circuit is further to select one of a plurality of defined execution priority levels at which the instruction will be prioritized for execution by the processor circuit, responsive to the characteristic of the data unit, and to identify the network address for accessing the instruction memory of the instruction storage node in response to the one of the plurality of defined execution priority levels.

* * * * *